US006480774B1

(12) United States Patent
Snow et al.

(10) Patent No.: US 6,480,774 B1
(45) Date of Patent: Nov. 12, 2002

(54) CONVERTIBLE TRANSMISSION SYSTEM

(75) Inventors: Kevin D. Snow, Augusta; Steven L. Melvin, Scotts; Matt W. Starks, Burlington; Douglas C. Gooch, Richland, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/359,785

(22) Filed: Jul. 23, 1999

(51) Int. Cl.$^7$ .................................................. G06F 7/00
(52) U.S. Cl. ............................. 701/51; 701/58; 474/69; 477/34
(58) Field of Search ............................. 701/51, 52, 58, 701/64, 66; 477/34, 118, 125, 110; 474/69, 70; 74/335, 336 R

(56) References Cited

U.S. PATENT DOCUMENTS

| | | | |
|---|---|---|---|
| 4,722,248 A | 2/1988 | Braun | 74/886 |
| 4,754,665 A | * 7/1988 | Vandervoot | 74/745 |
| 4,807,497 A | 2/1989 | Yasue et al. | 74/867 |
| 4,850,236 A | 7/1989 | Braun | 74/337 |
| 4,935,872 A | 6/1990 | Benford et al. | 364/424.1 |
| 4,941,096 A | 7/1990 | Ito et al. | 364/424.1 |
| 5,138,906 A | * 8/1992 | Iwatsuki et al. | 74/866 |
| 5,247,859 A | 9/1993 | Agusa et al. | 74/866 |
| 5,406,861 A | 4/1995 | Steeby | 74/336 R |
| 5,416,700 A | 5/1995 | Bates et al. | 364/424.1 |
| 5,429,559 A | 7/1995 | Steeby | 477/80 |
| 5,435,212 A | 7/1995 | Menig | 74/745 |
| 5,436,834 A | 7/1995 | Graf et al. | 364/424.1 |
| 5,459,658 A | 10/1995 | Morey et al. | 364/424.1 |
| 5,477,827 A | 12/1995 | Weisman, II et al. | 123/436 |
| 5,479,345 A | 12/1995 | Amsallen | 364/424.1 |
| 5,481,170 A | 1/1996 | Edelen et al. | 318/650 |
| 5,487,004 A | 1/1996 | Amsallen | 364/424.1 |
| 5,487,005 A | 1/1996 | Genise | 364/424.1 |
| 5,508,916 A | 4/1996 | Markyvech et al. | 364/424.1 |
| 5,527,237 A | * 6/1996 | Fowler et al. | 477/142 |
| 5,556,349 A | 9/1996 | Ishii et al. | 477/76 |
| 5,566,070 A | 10/1996 | Mack et al. | 364/424.1 |
| 5,591,102 A | 1/1997 | White et al. | 477/107 |
| 5,638,271 A | 6/1997 | White et al. | 701/62 |
| 5,650,932 A | 7/1997 | Chan et al. | 701/64 |
| 5,678,453 A | 10/1997 | Dresden, III | 74/335 |
| 5,679,092 A | 10/1997 | Otsubo et al. | 477/97 |
| 5,679,096 A | 10/1997 | Stine et al. | 477/111 |
| 5,729,454 A | 3/1998 | Amsallen | 701/51 |
| 5,738,606 A | 4/1998 | Bellinger | 477/111 |
| 5,755,639 A | 5/1998 | Genise et al. | 477/111 |
| 5,797,110 A | 8/1998 | Braun et al. | 701/84 |
| 5,816,100 A | 10/1998 | Fowler et al. | 74/335 |
| 5,868,646 A | 2/1999 | Spichalsky | 477/97 |
| 5,876,302 A | 3/1999 | Palmeri | 477/111 |
| 5,907,974 A | 6/1999 | Stine | 74/473.21 |
| 5,946,972 A | 9/1999 | Palmeri | 74/335 |
| 6,049,751 A | 4/2000 | Palmeri | 701/51 |

FOREIGN PATENT DOCUMENTS

CA          1198501          12/1985

* cited by examiner

Primary Examiner—Yonel Beaulieu
(74) Attorney, Agent, or Firm—Rader, Fishman & Grauer PLLC

(57) ABSTRACT

A convertible transmission system for a vehicle having an input shaft for connection to an engine and an output shaft for delivering rotational power to at least one axle. The transmission has a plurality of available gear ratios resulting in a maximum number of available gear ratios. In addition, a programmable controller is provided for selectively controlling the transmission to operate in a first operating configuration utilizing a first predetermined number of the available gear ratios that is less than the maximum number of available gear ratios. Moreover, the programmable control can have additional transmission configurations by selectively modifying certain operating characteristics, including for example, available gear ratios, desired operating gear ratios, maximum torque limits, shift points, default starting gear ratio, data relating to a predetermined shift strategy, a coast down gear ratio, shift delay timing, and/or skip shifting.

27 Claims, 5 Drawing Sheets

REPRESENTATIVE VALUES FOR CONVERTIBLE
TRANSMISSIONS BASED ON A MAXIMUM 18 SPEEDS

| 18 SPEED | 1 | 2 | 3 | 4 | 5 | 6 | 7 | 8 | 9 |
|---|---|---|---|---|---|---|---|---|---|
| RATIO | 14.40 | 12.29 | 8.56 | 7.30 | 6.05 | 5.16 | 4.38 | 3.74 | 3.20 |
| STEP | | 17% | 44% | 17% | 21% | 17% | 18% | 17% | 17% |
| TORQUE LIMITING VALUES | 1850 | 1850 | 1850 | 1850 | 1850 | 1850 | 1850 | 1850 | 1850 |
| UPSHIFT OFFSET (RPM) | 0 | 200 | 300 | 300 | 300 | 300 | 300 | 250 | 200 |
| DEFAULT START GEAR | 2 | | | | | | | | |
| MAX START GEAR | 7 | | | | | | | | |
| MIN REVERSE GEAR | -4 | | | | | | | | |
| DEFAULT REVERSE GEAR | -2 | | | | | | | | |

| 18 SPEED | 10 | 11 | 12 | 13 | 14 | 15 | 16 | 17 | 18 |
|---|---|---|---|---|---|---|---|---|---|
| RATIO | 2.73 | 2.29 | 1.95 | 1.62 | 1.38 | 1.17 | 1.00 | 0.86 | 0.73 |
| STEP | 17% | 19% | 17% | 20% | 17% | 18% | 17% | 16% | 18% |
| TORQUE LIMITING VALUES | 1850 | 1850 | 1850 | 1850 | 1850 | 1850 | 2050 | 2050 | 2050 |
| UPSHIFT OFFSET (RPM) | 200 | 150 | 100 | 50 | 0 | 0 | 0 | 0 | 0 |
| DEFAULT START GEAR | 2 | | | | | | | | |
| MAX START GEAR | 7 | | | | | | | | |
| MIN REVERSE GEAR | -4 | | | | | | | | |
| DEFAULT REVERSE GEAR | -2 | | | | | | | | |

FIG 2A

REVERSE RATIOS

| LL | LH | HL | HH |
|---|---|---|---|
| 15.1 | 12.85 | 4.03 | 3.43 |

REPRESENTATIVE VALUES FOR CONVERTIBLE
TRANSMISSIONS BASED ON A MAXIMUM 18 SPEEDS

| (ACTUAL 18 SPEED GEAR) | (4) | (6) | (8) | (10) | (12) | (14) | (16) | (17) | (18) | REVERSE RATIOS | |
|---|---|---|---|---|---|---|---|---|---|---|---|
| 7LL SPEED | 1L | L | 1 | 2 | 3 | 4 | 5 | 6 | 7 | (LH) -1 | (HH) -2 |
| RATIO | 7.30 | 5.16 | 3.74 | 2.73 | 1.95 | 1.38 | 1.00 | 0.86 | 0.73 | 12.85 | 3.43 |
| STEP |  | 41% | 38% | 37% | 40% | 42% | 38% | 17% | 17% | | |
| TORQUE LIMITING VALUES | 1450 | 1450 | 1650 | 1650 | 1650 | 1650 | 1650 | 1850 | 1850 | | |
| UPSHIFT OFFSET (RPM) | 100 | 150 | 100 | 100 | 100 | 100 | 100 | 50 | 0 | | |
| DEFAULT START GEAR | 3 | | | | | | | | | | |
| MAX START GEAR | 4 | | | | | | | | | | |
| MIN REVERSE GEAR | -2 | | | | | | | | | | |
| DEFAULT REVERSE GEAR | -1 | | | | | | | | | | |

| (ACTUAL 18 SPEED GEAR) | (2) | (3) | (5) | (7) | (9) | (11) | (12) | (13) | (14) | (15) | (16) | (17) | (18) | REVERSE RATIOS | |
|---|---|---|---|---|---|---|---|---|---|---|---|---|---|---|---|
| 13 SPEED | 1 | 2 | 3 | 4 | 5 | 6 | 7 | 8 | 9 | 10 | 11 | 12 | 13 | (LH) -1 | (HH) -2 |
| RATIO | 12.29 | 8.56 | 6.05 | 4.38 | 3.20 | 2.29 | 1.95 | 1.62 | 1.38 | 1.17 | 1.00 | 0.86 | 0.73 | 12.85 | 3.43 |
| STEP |  | 44% | 41% | 38% | 37% | 40% | 17% | 20% | 17% | 18% | 17% | 16% | 18% | | |
| TORQUE LIMITING VALUES | 1450 | 1450 | 1850 | 1850 | 1850 | 1850 | 1850 | 1850 | 1850 | 1850 | 2050 | 2050 | 2050 | | |
| UPSHIFT OFFSET (RPM) | 400 | 450 | 450 | 400 | 150 | 150 | 100 | 0 | 0 | 0 | 0 | 0 | 0 | | |
| DEFAULT START GEAR | 2 | | | | | | | | | | | | | | |
| MAX START GEAR | 5 | | | | | | | | | | | | | | |
| MIN REVERSE GEAR | -1 | | | | | | | | | | | | | | |
| DEFAULT REVERSE GEAR | -1 | | | | | | | | | | | | | | |

FIG 2B

REPRESENTATIVE VALUES FOR CONVERTIBLE TRANSMISSIONS BASED ON A MAXIMUM 18 SPEEDS

| (ACTUAL 18 SPEED GEAR) | (1) | (3) | (6) | (9) | (11) | (13) | (15) | (16) | (17) | (18) | REVERSE (LL) | RATIOS (HH) |
|---|---|---|---|---|---|---|---|---|---|---|---|---|
| SUPER FLEET MODEL | 1 | 2 | 3 | 4 | 5 | 6 | 7 | 8 | 9 | 10 | -1 | -2 |
| 10-12 SPD (OVERDRIVE) | 14.4 | 8.56 | 5.16 | 3.2 | 2.29 | 1.62 | 1.17 | 1.00 | 0.86 | 0.73 | 15.06 | 3.43 |
| STEP | | 68% | 66% | 61% | 40% | 41% | 38% | 17% | 16% | 18% | | |
| TORQUE LIMITING VALUES | 1650 | 1650 | 1650 | 1650 | 1650 | 1650 | 0 | 0 | 2050 | 2050 | | |
| UPSHIFT OFFSET (RPM) | 400 | 450 | 450 | 200 | 150 | 100 | 0 | 0 | 0 | 0 | | |

DEFAULT START GEAR  2
MAX START GEAR  3
MIN REVERSE GEAR  -1
DEFAULT REVERSE GEAR  -2

| (ACTUAL 18 SPEED GEAR) | (1) | (3) | (6) | (9) | (11) | (12) | (13) | (14) | (15) | (16) | REVERSE (LL) | RATIOS (HH) |
|---|---|---|---|---|---|---|---|---|---|---|---|---|
| SUPER FLEET MODEL | 1 | 2 | 3 | 4 | 5 | 6 | 7 | 8 | 9 | 10 | -1 | -2 |
| 10-12 SPD (DIRECT) | 14.4 | 8.56 | 5.16 | 3.20 | 2.30 | 1.95 | 1.62 | 1.38 | 1.17 | 1.00 | 15.06 | 3.43 |
| STEP | | 68% | 66% | 61% | 39% | 18% | 20% | 17% | 18% | 17% | | |
| TORQUE LIMITING VALUES | 1650 | 1650 | 1650 | 1650 | 1650 | 1650 | 1650 | 2050 | 2050 | 2050 | | |
| UPSHIFT OFFSET (RPM) | 400 | 450 | 450 | 200 | 150 | 100 | 50 | 0 | 0 | 0 | | |

DEFAULT START GEAR  1
MAX START GEAR  3
MIN REVERSE GEAR  -1
DEFAULT REVERSE GEAR  -2

FIG 3A

REPRESENTATIVE VALUES FOR CONVERTIBLE
TRANSMISSIONS BASED ON A MAXIMUM 18 SPEEDS

| | (1) | (2) | (4) | (6) | (8) | (10) | (12) | (14) | (16) | (18) | REVERSE RATIOS |
|---|---|---|---|---|---|---|---|---|---|---|---|
| | | | | | | | | | | | (LL) (LH) (HH) |
| (ACTUAL 18 SPEED GEAR) | 1L | L | 1 | 2 | 3 | 4 | 5 | 6 | 7 | 8 | -1  -2  -3 |
| 8LL SPEED | | | | | | | | | | | 15.06  12.85  3.43 |
| RATIO | 14.40 | 12.29 | 7.30 | 5.16 | 3.74 | 2.73 | 1.95 | 1.38 | 1.00 | 0.73 | |
| STEP | | 17% | 68% | 41% | 38% | 37% | 40% | 41% | 38% | 37% | |
| TORQUE LIMITING VALUES | 1450 | 1450 | 1650 | 1650 | 1650 | 1650 | 1650 | 1850 | 1850 | 1850 | |
| UPSHIFT OFFSET (RPM) | 0 | 100 | 550 | 150 | 100 | 100 | 100 | 150 | 100 | 100 | |
| DEFAULT START GEAR 3 | | | | | | | | | | | |
| MAX START GEAR 4 | | | | | | | | | | | |
| MIN REVERSE GEAR -3 | | | | | | | | | | | |
| DEFAULT REVERSE GEAR -1 | | | | | | | | | | | |

FIG 3B

CONVERTIBLE TRANSMISSION SYSTEM

FIELD OF THE INVENTION

The present invention relates to automated and automatic mechanical transmissions for motor vehicles and, more particularly, to an apparatus and method for converting a transmission from one operating configuration to another operating configuration. The operating configurations may utilize fewer than the maximum number of available transmission gear ratios. Other transmission characteristics can additionally be changed to result in a new operating configuration.

BACKGROUND OF THE INVENTION

Engine manufacturers have been modifying and increasing power ratings of existing engines while transmission manufacturers, in general, have not modified the corresponding transmissions that mate with those engines. As a result, transmission components, such as gears, shifters, input and output shafts, all have increased loading. Moreover, an engine having an increased power rating that is coupled to a transmission designed for lower power ratings diminishes overall efficiency and decreases transmission service life.

Automatic and automated transmissions are known for use in motor vehicles and have the ability to perform gear shifts without driver intervention. Gear shifting is typically performed by hydro-mechanical or electro-mechanical devices and is based on characteristics such as engine speed or throttle position. Transmissions that are electronically controlled by a programmable computer are also known. Some transmissions are able to modify their shift points in response to a request for greater fuel efficiency or more power. The transmissions may have two sets of shift points, one set for fuel efficiency and a second shift point set for more power to improve starting or load carrying capability. Thus, shifting of the transmission may be modified depending on the needs of a vehicle operator. Still further, it is known to adjust the gear shift points by considering operating conditions such as grade and load. See for example, U.S. Pat. Nos. 5,479,345 and 5,416,700, the disclosures of which is hereby incorporated by reference.

However, the previously known automatic or automated transmissions do not permit a vehicle operator to change the overall operating characteristics of the transmission. For example, the previous transmissions do not allow changing a transmission for use in an 18 speed highway tractor trailer to be used instead in a 10 speed local delivery dump truck.

In addition, the prior transmissions do not permit an operator, repairman or even the transmission itself to selectively eliminate a gear from the set of available transmission gears upon excessive wear or damage to that gear. Further, the prior art does not permit a reorganizing of remaining available gears to smoothly make up for a gear that is eliminated.

SUMMARY OF THE INVENTION

The present invention is directed to a convertible transmission system for a vehicle comprising a transmission having an input shaft for connection to an engine and an output shaft for delivering rotational power to at least one axle. The transmission has a plurality of available gear ratios resulting in a maximum number of available gear ratios. In addition, a programmable controller is provided for selectively controlling the transmission to operate in a first operating configuration utilizing a first predetermined number of the available gear ratios that is less than the maximum number of available gear ratios.

In accordance with the present invention, the programmable controller can provide for selectively controlling the transmission to operate in a first operating configuration utilizing a first predetermined number of the available gear ratios and a second operating configuration utilizing a second predetermined number of the available gear ratios. The first predetermined number of the available gear ratios can be greater than, less than, or equal to the second predetermined number.

The first and second operating configurations can optionally include respective first and second predetermined maximum torque limits, for each of the available gear ratios and/or first and second predetermined shift point patterns and/or shift strategies and/or predetermined coast down gears and/or default starting gears.

The convertible transmission system of the present invention optionally includes the first and second operating configurations respectively having first and second predetermined sets of forward gear ratios and/or sets of reverse gear ratios selected from the available gear ratios.

Further, the first and second operating configurations optionally respectively include first and second predetermined shift delay timing.

In addition, the first predetermined number of available gear ratios can be any number, for example, 18 and the second predetermined number of available gear ratios can be a positive integer equal to or less than the first predetermined number, including, for example, 7, 8, 10, 12, 13 or 15.

The convertible transmission system of the present invention has the ability to use a second operating configuration that skips or eliminates a predetermined shift that was present in the first operating configuration because an original one of the available gear ratios is no longer available due to gear wear or gear failure. Further, the second operating configuration can include at least one of adjusted torque limits and adjusted shift points to compensate for gear wear or gear failure.

According to one embodiment of the present invention, the programmable controller controls the transmission to operate in a first operating configuration utilizing the maximum number of available gear ratios and a second operating configuration utilizing less than the maximum number of available gear ratios. In addition, the second operating configuration can include at least one of adjusted torque limits and adjusted shift points to compensate for gear wear.

The present invention is also directed to a method of operating a transmission having a plurality of available gear ratios resulting in a maximum number of available gear ratios comprising the steps of: selecting a first predetermined set of desired gear ratios from the plurality of available gear ratios for establishing a first transmission operating configuration and determining a change in at least one operating condition that necessitates selecting a second predetermined set of desired gear ratios from the plurality of available gear ratios for establishing a second transmission operating configuration. The at least one operating condition can be a vehicle operator's desire for improved performance, excessive gear wear or gear damage, and/or an expected vehicle application (e.g. a dump truck or tractor trailer application).

Therefore, the present invention provides a transmission system that permits a vehicle operator to change the overall operating characteristics of the transmission. For example, the same transmission can be re-configured for use in an 18 speed highway tractor trailer or a 10 speed local delivery dump truck. The present invention permits a same transmission having a maximum number of available gears to be utilized as if the transmission had been designed and manufactured with fewer gears.

In addition, the transmission system of the present invention permits an operator or repairman to selectively eliminate a gear from being selected from the set of available transmission gears when excessive wear or damage to that gear is discovered. Further, the present invention permits a reconfiguring of remaining available gears, shift strategy, default starting gear, reverse gears, forward gears, torque limits, and/or shift points to smoothly compensate for the gear that was eliminated because of wear.

Accordingly, the present invention allows a transmission manufacturer to have increased production volume of a single convertible transmission model instead of multiple lower volume non-convertible transmission models resulting in production efficiencies and lower manufacturing costs. Vehicle manufacturers and repair facilities can order and stock a single convertible transmission model rather than several different transmission models, which reduces inventory tracking costs and the rate of inventory turn-over.

Still further, a vehicle operator can efficiently change the transmission configuration as needed. For example, a vehicle operator may reconfigure the transmission to compensate for gear wear, driving through mountain roads, changing from city driving to highway driving. A convertible transmission can be modified when a vehicle is sold from a location having relatively flat city driving for use in highway mountain driving. Alternatively, the transmission can be re-configured if it was originally installed on a tractor trailer logging truck and then removed and installed on a cement truck that drives on flat city streets.

The increased weight of additional gears in a convertible transmission has the drawback of lowering fuel efficiency. However, the increased weight drawback is sufficiently offset by the increased efficiency of an automated transmission and the increased efficiencies in manufacturing and inventory control.

BRIEF DESCRIPTION OF THE DRAWINGS

The features and inventive aspects of the present invention will become more apparent upon reading the following detailed description, claims, and drawings, of which the following is a brief description:

FIG. 2 is a table of representative transmission configurations for a convertible transmission according to the present invention.

FIG. 3 is a table of further representative transmission configurations.

DETAILED DESCRIPTION OF PREFERRED EMBODIMENTS

Figure 1:
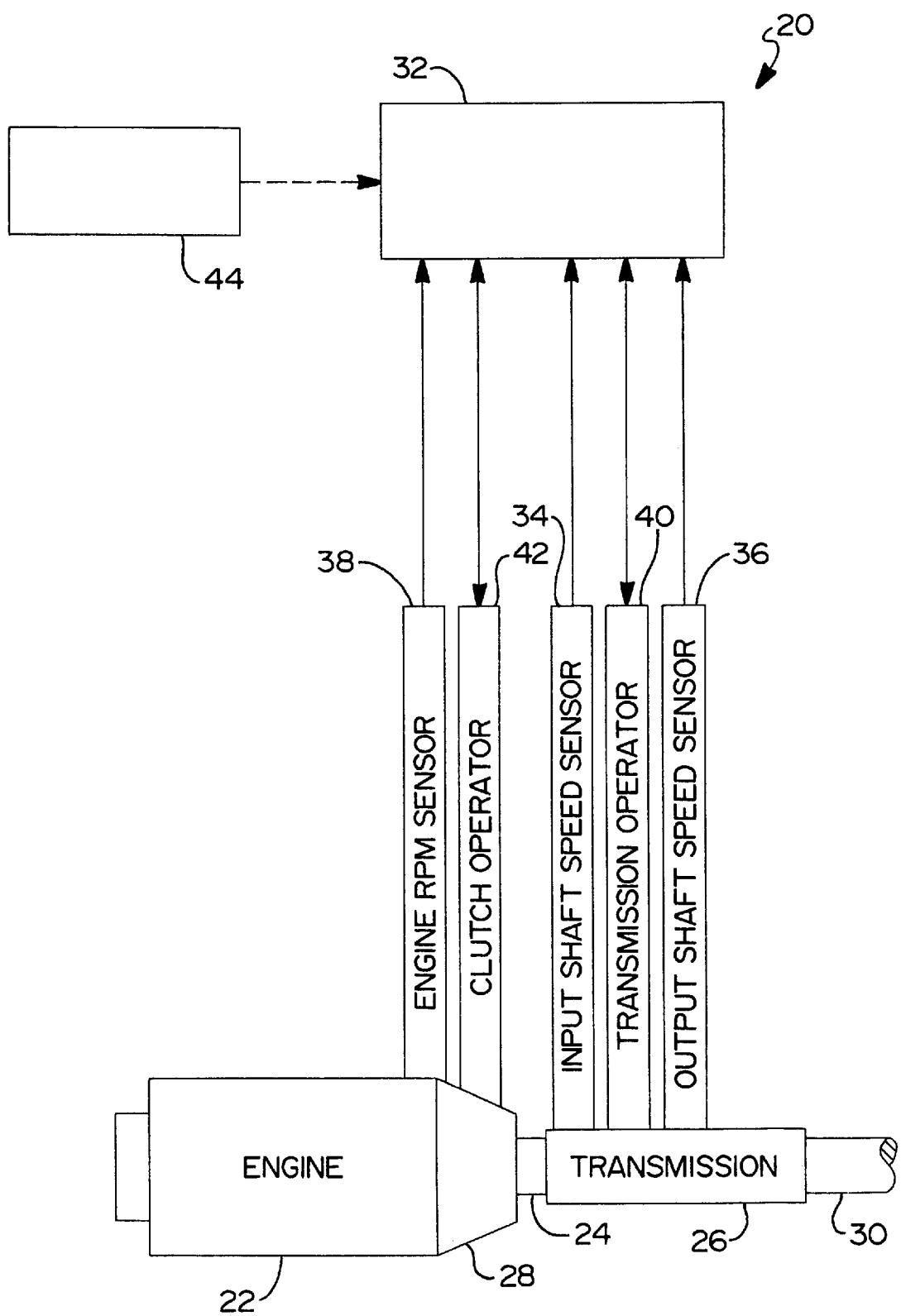
FIG. 1 is a schematic of the transmission control system of the present invention.

FIG. 1 shows a convertible transmission system 20 according to the present invention having a vehicle engine 22 that is selectively coupled to an input shaft 24 of a transmission 26 by a friction clutch mechanism 28. Transmission 26 further includes an output shaft 30 that is driven at a speed that is reduced relative to the speed of the input shaft 24 by a selected transmission gear ratio. Output shaft 30 is connected to a vehicle axle, which in turn is connected to drive wheels. Transmission 26 can be any suitable type of transmission including, for example, transmissions such as disclosed in U.S. Pat. Nos. 3,105,395; 4,735,109; 4,754,665, the disclosures of which are hereby incorporated by reference.

A programmable electronic transmission control unit 32 receives and processes engine and transmission data, including data from input shaft speed sensor 34, output shaft speed sensor 36, and engine rpm sensor 38. The transmission control unit 32 outputs signals for controlling transmission 26 and clutch 28, including controlling transmission operator 40 and clutch operator 42. One of the functions of transmission operator 40 is to selectively shift gears of transmission 26 in response to command signals from transmission control unit 32. Preferably, transmission operator 40 includes an electromagnetic X-Y shifter and rail that operates in conjunction with a range and/or splitter to efficiently and reliably change gears. However, other suitable transmission operators are contemplated to be used including but not limited to a pneumatic X-Y shifter and/or valve actuators.

Transmission 26 includes a plurality of gears that combine to define a plurality of available gear ratios that can be selected for coupling input shaft 24 to output shaft 30. A maximum number of gears in transmission 26 creates a maximum number of available gear ratios. For example, transmission 26 may have a maximum number of eighteen (18) available gear ratios, i.e. an 18 speed transmission.

Transmission control unit 32 includes a memory for storing at least one set of transmission operating characteristics that define a transmission operating configuration, including any one or more of the following: a maximum number of available gear ratios, a set of available gear ratios, a set of desired operating gear ratios selected from the plurality of available gear ratios, a predetermined maximum torque limit for each desired operating gear ratio, predetermined set of shift points, a default starting gear ratio, data relating to a predetermined shift strategy, an upshift offset, a predetermined coast down gear ratio, a predetermined set of desired forward gear ratios, a predetermined set of desired reverse gear ratios, predetermined shift delay timing, and/or predetermined skip shifting. Other suitable transmission operating characteristics can be used without departing from the spirit of the present invention.

Preferably, transmission control unit 32 can be programmned to change one or more of the above operating characteristics to create a second operating configuration for transmission 26. For example, transmission control unit 32 can be initially programmed at a vehicle manufacturing plant with a configuration for a 10 speed direct drive transmission and later re-programmed at a dealership to convert to a 10 speed overdrive transmission, based on a particular customer's desire. In addition, transmission 26 can be manufactured with a maximum number of available gear ratios, but programmed to have a configuration that utilizes fewer than the maximum number of available gear ratios. For example, transmission 26 may have a maximum of 18 available gear ratios, but be programmed via transmission control unit 32 to have only a 10 speed transmission configuration. At a later date, if operating conditions change or an operator desires a different configuration, the same transmission 26 can be re-programmed to have fewer or more desired gear ratios. Thus, for example, a 10 speed transmission configuration can be changed to a 7, 8, 13, 15 or 18 speed transmission.

Further, the transmission system 20 of the present invention allows a vehicle operator to compensate for wear on a particular gear by selectively eliminating that gear from the transmission configuration. Thus, as exemplified in FIGS. 2 and 3, if the gear corresponding to a 14.40 gear ratio in a 8 LL speed transmission configuration is determined to have excessive wear or damage, that same transmission can be re-programmed to have the illustrated 7 LL speed configuration, which does not utilize a 14.40 gear ratio. Compare the 8 LL speed configuration example in FIG. 3 to the 7 LL speed configuration example in FIG. 2. Accordingly, the service life of the transmission 26 can be greatly extended.

Excessive wear or damage of a gear or gear set can be determined by either the driver or by feedback to the transmission control unit 32 when a particular gear ratio cannot be selected or is very difficult to select. In addition, a vibration sensor can be used to indicate a vibration value that transmission control unit 32 compares to a threshold value to determine if a particular gear has become worn or damaged. Alternatively, degree of gear wear can be ascertained by visual inspection during servicing or any other suitable technique. In response to determining that a gear is excessively worn, transmission control unit 32 preferably automatically adjusts the configuration of the transmission to eliminate the particular gear that exhibits excessive wear. Such elimination can be accomplished by automatically skip shifting that particular gear or reconfiguring the transmission 26 to eliminate that gear from the set of available or desired gear ratios. For example, assuming that excessive gear wear was present in one of the gears of the 5.16 gear ratio of the 18 speed configuration, the transmission control unit 32 can automatically adjust the shift strategy to automatically skip past $6^{th}$ gear and avoid further use of the 5.16 gear ratio. The transmission 26 can also be reconfigured to replace the worn gear with one or more of the available gears that was not previously desired to be used. For example, if a transmission is originally configured to have a 7 LL speed configuration and $1^{st}$ gear having a 3.74 ratio is detennined to have excessive wear, then it can be replaced by the 3.20 gear ratio that was previously not used. The 3.20 ratio corresponds to $9^{th}$ gear of an 18 speed transmission. See FIG. 2.

Alternatively, the transmission control unit 32 can be programmed to reconfigure the transmission 26 such that the remaining 17 gears be utilized with modified shift points and/or modified torque limits. Still further, transmission control unit 32 may be programmed to re-configure the 18 speed transmission to a 13 speed configuration that does not use a 5.16 gear ratio in the example shown in FIG. 2. It should be noted that transmission control unit 32 can be originally programmed to have single or multiple transmission configurations stored in its memory or later programmed via any suitable external signal or device 44 to have additional or custom transmission configurations.

Similarly, if gear wear is ascertained by visual inspection or the vehicle operator, then transmission control unit 32 can receive one or more signals from an external device 44 to effect a different transmission configuration. Thus, gear wear is compensated by eliminating that gear's particular gear ratio from the list of available or desired gear ratios.

The gear wear compensation feature of the present invention is especially useful for selecting a different starting gear when the first starting gear is determined to have damage or wear that exceeds a base threshold. By converting to a new default starting gear, the convertible transmission system 20 can continue its useful service life without sacrificing smooth starting capability and ensuring very satisfactory driveability.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A convertible transmission system for a vehicle comprising:

a transmission having an input shaft for connection to an engine and an output shaft for delivering power to at least one axle, said transmission having a plurality of available gear ratios resulting in a maximum number of available gear ratios;

a programmable controller for selectively controlling said transmission to operate in a first operating configuration utilizing a first predetermined number of said available gear ratios and a second operating configuration utilizing a second predetermined number of said available gear ratios, wherein said first predetermined number of said available gear ratios is greater than said second predetermined number.

2. The convertible transmission system of claim 1, wherein said first and second operating configurations respectively include first and second predetermined maximum torque limits, for each of said available gear ratios.

3. The convertible transmission system of claim 1, wherein said first and second operating configurations respectively include first and second predetermined shift point patterns.

4. The convertible transmission system of claim 1, wherein said first and second operating configurations respectively include first and second predetermined shift strategies.

5. The convertible transmission system of claim 1, wherein said first and second operating configurations respectively include first and second predetermined coast down gears.

6. The convertible transmission system of claim 1, wherein said first and second operating configurations respectively include first and second predetermined default starting gear ratios.

7. The convertible transmission system of claim 1, wherein said first and second operating configurations respectively include first and second predetermined sets of forward gear ratios selected from said available gear ratios.

8. The convertible transmission system of claim 1, wherein said first and second operating configurations respectively include first and second predetermined sets of forward and reverse gear ratios selected from said available gear ratios.

9. The convertible transmission system of claim 1, wherein said first and second operating configurations respectively include first and second predetermined shift delay timing.

10. The convertible transmission system of claim 1, wherein said first predetermined number of available gear ratios is 18 and said second predetermined number of available gear ratios is a positive integer less than 18.

11. The convertible transmission system of claim 10, wherein said second predetermined number of available gear ratios is one of 7, 8, 10, 12, 13 and 15.

12. The convertible transmission system of claim 1, wherein said second operating configuration skips a predetermined shift of the first operating configuration because an original one of said available gear ratios is no longer available due to gear wear or damage.

13. The convertible transmission system of claim 12, wherein said second operating configuration includes at least one of adjusted torque limits and adjusted shift points to compensate for gear wear or damage.

14. A convertible transmission system for a vehicle comprising:
a transmssion having an input shaft for connection to an engine and an output shaft for delivering power to at least one axle, said transmission having a plurality of gear ratios resulting in a maximum number of available gear ratios;
a programmable controller for selectively controlling said transmission to operate in a first operating configuration utilizing the maximum number of available gear ratios and a second operating configuration utilizing less than the maximum number of available gear ratios.

15. The convertible transmission system of claim 14, wherein said first and second operating configurations respectively include first and second predetermined maximum torque limits, for each of said available gear ratios.

16. The convertible transmission system of claim 14, wherein said first and second operating configurations respectively include first and second predetermined default starting gear ratios.

17. The convertible transmission system of claim 14, wherein said second operating configuration skips a predetermined shift of the first operating configuration because an original one of said available gear ratios is no longer available due to gear wear or damage.

18. The convertible transmission system of claim 17, wherein said second operating configuration includes at least one of adjusted torque limits and adjusted shift points to compensate for gear wear or damage.

19. The convertible transmission system of claim 14, wherein said first predetermined number of available gear ratios is 18 and said second predetermined number of available gear ratios is a positive integer less than 18.

20. The convertible transmission system of claim 14, further including a third operating configuration.

21. A convertible transmission system for a vehicle comprising:
transmission having an input shaft for connection to an engine and an output shaft for delivering rotational power to at least one axle, said transmission having a plurality of gear ratios resulting in a maximum number of available gear ratios;
a programmable controller for selectively controlling said transmission to operate in a first operating configuration utilizing a first predetermined number of said available gear ratios that is less than the maximum number of available gear ratios.

22. The convertible transmission system of claim 21, further including a second operating configuration utilizing a second predetermined number of said available gear ratios, wherein said first predetermined number of said available gear ratios is different than said second predetermined number.

23. The convertible transmission system of claim 22, further including respective first and second predetermined shift point patterns and respective first and second predetermined maximum torque limits for each of said available gear ratios.

24. A method of operating a transmission having a plurality of available gear ratios resulting in a maximum number of available gear ratios comprising the steps of:
selecting a first predetermined set of desired gear ratios from the plurality of available gear ratios for establishing a first transmission operating configuration;
determining a change in at least one operating condition that necessitates selecting a second predetermined set of desired gear ratios from the plurality of available gear ratios for establishing a second transmission operating configuration.

25. The method of claim 24, wherein said at least one operating condition is excessive gear wear.

26. The method of claim 25, wherein said at least one operating condition is an expected vehicle application.

27. The method of claim 26, wherein said at least one operating condition is a vehicle operator's desire for improved performance.

* * * * *

UNITED STATES PATENT AND TRADEMARK OFFICE
CERTIFICATE OF CORRECTION

PATENT NO. : 6,480,774 B1
DATED : November 12, 2002
INVENTOR(S) : Snow et al.

It is certified that error appears in the above-identified patent and that said Letters Patent is hereby corrected as shown below:

Column 6,
Line 16, change "ratios and" to -- ratios, as required by a transmission manufacturer; --.
Line 18, change "ratios, wherein" to -- ratios, as required by a vehicle operator due to a change in a vehicle operating condition; wherein --
Lines 18-19, change "is greater than said second predetermined number." to -- is one of less than, greater than, or equal to, said second predetermined number for allowing the transmission manufacturer to produce a higher volume of a single convertible transmission model that can be utilized in a variety of different vehicle applications instead of multiple lower volume non-convertible transmission models. --
Line 67, change "configuration includes" to -- configuration reorganizes remaining gear ratios by adjusting --

Column 7,
Line 1, change "of adjusted torque limits and adjusted shift" to -- of torque limits and shift --
Line 2, change "compensate for gear" to -- smoothly compensate for skipping the gear ratio that is no longer available due to gear --
Line 12, change "utilizing the maximum number" to -- utilizing a first predetermined number --
Line 14, change "less than the maximum number of available gear ratios." to -- a second predetermined number of available gear ratios for permitting the transmission to be reconfigured for a different type of vehicle application. --
Line 29, change "configuration includes at" to -- configuration reorganizes remaining gear ratios by adjusting at --
Line 30, change "of adjusted torque limits and adjusted shift points to" to -- of torque limits and shift points to smoothly --
Line 31, change "for gear" to -- for skipping the gear ratio that is no longer available due to gear --

Column 8,
Lines 12-15, change "ratios, wherein said first predetermined number of said available gear ratios is different than said second predetermined number." to -- ratios that is less than said first predetermined number. --
Line 32, change "configuration." to -- configuration; wherein the change in at least one operating condition is one of: excessive gear wear, a change in expected vehicle application or a vehicle operator's desire for improved performance. --
Line 34, change "wear." to -- wear beyond a threshold value. --

UNITED STATES PATENT AND TRADEMARK OFFICE
CERTIFICATE OF CORRECTION

PATENT NO. : 6,480,774 B1
DATED : November 12, 2002
INVENTOR(S) : Snow et al.

It is certified that error appears in the above-identified patent and that said Letters Patent is hereby corrected as shown below:

<u>Column 8 (cont'd),</u>
Line 41, add the following claims:

28. The convertible transmission system of claim 1, wherein said programmable controller originally has at least said first operating configuration stored in its memory and can be re-programmed via an external signal or device to have said second operating configuration.

29. The convertible transmission system of claim 1, wherein said programmable controller originally has at least said first and second operating configurations stored in its memory and can be re-programmed via an external signal or device to have at least one additional operating configuration.

30. The convertible transmission system of claim 14, wherein the transmission is reconfigured for a different type of vehicle application to allow the transmission to be removed from one kind of vehicle and re-installed for use in a different kind of vehicle.

31. The convertible transmission system of claim 14, wherein the transmission is reconfigured for a different type of vehicle application to provide improved performance in response to a change in driving conditions or vehicle location.

32. The convertible transmission system of claim 21, further including a second operating configuration utilizing a second predetermined number of said available gear ratios that is greater than said first predetermined number.

33. The convertible transmission system of claim 32, wherein said second predetermined number is also less than the maximum number of available gear ratios.

34. The convertible transmission system of claim 32, wherein said second predetermined number is the maximum number of available gear ratios.

35. The convertible transmission system of claim 21, further including a second operating configuration utilizing a second predetermined number of said available gear ratios that is equal to said first predetermined number but at least one of said available gear ratios in said second operating configuration is different from said original operating configuration.

36. The convertible transmission system of claim 35, wherein said second operating configuration replaces a worn one of said available gear ratios in said original configuration with one of said plurality of gear ratios that was not previously utilized."

Signed and Sealed this

Twenty-fourth Day of June, 2003

JAMES E. ROGAN
*Director of the United States Patent and Trademark Office*